United States Patent
Shukla

(10) Patent No.: US 9,871,761 B2
(45) Date of Patent: Jan. 16, 2018

(54) METHODS AND APPARATUS FOR IMPLEMENTING A FIBRE CHANNEL ZONE POLICY

(75) Inventor: Amit Shukla, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 640 days.

(21) Appl. No.: 13/324,424

(22) Filed: Dec. 13, 2011

(65) Prior Publication Data
US 2013/0148659 A1 Jun. 13, 2013

(51) Int. Cl.
*H04L 29/12* (2006.01)
*H04L 29/06* (2006.01)
*H04L 12/46* (2006.01)

(52) U.S. Cl.
CPC ...... *H04L 61/2046* (2013.01); *H04L 12/4625* (2013.01); *H04L 12/4641* (2013.01); *H04L 61/2038* (2013.01); *H04L 61/6045* (2013.01); *H04L 63/20* (2013.01)

(58) Field of Classification Search
CPC ............ H04L 12/4625; H04L 12/4641; H04L 61/6045; H04L 61/2046; H04L 61/2038; H04L 63/20
See application file for complete search history.

(56) References Cited

U.S. PATENT DOCUMENTS

| | | | | |
|---|---|---|---|---|
| 8,284,785 | B2* | 10/2012 | Hirata | H04L 49/10 370/254 |
| 2002/0176434 | A1* | 11/2002 | Yu | H04L 49/103 370/422 |
| 2009/0037977 | A1* | 2/2009 | Gai | H04L 41/00 726/1 |
| 2009/0296726 | A1* | 12/2009 | Snively et al. | 370/401 |
| 2011/0051733 | A1 | 3/2011 | Hirata | |
| 2011/0135303 | A1 | 6/2011 | Hufferd | |
| 2011/0200330 | A1 | 8/2011 | Sasso et al. | |
| 2011/0280255 | A1* | 11/2011 | DeSanti | 370/419 |
| 2013/0329743 | A1* | 12/2013 | Gai | H04L 29/08702 370/400 |

OTHER PUBLICATIONS

Fibre Channel Backbone—5 (FC-BB-5) Rev 2.00, Jun. 4, 2009, pp. 90-91 and 98-99.*

(Continued)

*Primary Examiner* — Joseph Bednash
(74) *Attorney, Agent, or Firm* — Cooley LLP

(57) ABSTRACT

In some embodiments, an apparatus includes a first network switch configured to be within a Fiber Channel over Ethernet (FCoE) network, which has a set of network switches including the first network switch. The first network switch is configured to receive, from a first network device, a login signal including a proposed logical identifier for the first network device. The first network switch is configured to send, in response to the login signal, a multicast signal including the proposed logical identifier to remaining network switches from the set of network switches. As a result, a second network switch from the set of network switches enforces a zone policy in response to receiving the multicast signal and prior to sending the proposed logical identifier to a second network device.

20 Claims, 4 Drawing Sheets

(56) References Cited

OTHER PUBLICATIONS

European Search Report dated Jan. 30, 2013 for European Application No. 12185140.6 filed Sep. 20, 2012.
Brass Tacks, "PT2PT and VN2VN—Directly connecting an FCoE initiator to an FCoE target (Part 1—Overview)" [Online] Retrieved from the Internet: <URL: http://www.brasstacksblog.typepad.com/brass-tacks/2011/03/pt2pt-and-v . . . >, Nov. 9, 2007, posted Mar. 8, 2011 (5 pages).
John L. Hufferd et al. "The Missing Piece (FCoE Data Transfer End to End with FCF assistance)" T11/10-339v1, Aug. 4, 2010 (15 pages).
Claudio DeSanti et al. Locally Unique N_Port_IDs, T11/10-019v2, Jan. 2010 (12 pages).
Claudio DeSanti et al. "VN2VN Multi-Point and Point-to-Point" T11/10-156v0, Mar. 2010 (32 pages).
Borysowich, Craig. SAN Zoning Methods [online], Dec. 2001 [retrieved on May 1, 2015]. Retrieved from the Internet: < URL: http://www.comptechdoc.org/docs/craig/sanzoning/>.
Juniper Networks. SRX Getting Started—Stateless Firewall Filters (ACLs) Use Case [online], 2009-2012 [retrieved on Apr. 30, 2015]. Retrieved from the Internet: < URL: http://kb.juniper.net/InfoCenter/index?page=content&id=KB16685>.
Office Action for European Patent Application No. 12185140.6, dated Aug. 1, 2017, 4 pages.

\* cited by examiner

METHODS AND APPARATUS FOR IMPLEMENTING A FIBRE CHANNEL ZONE POLICY

BACKGROUND

Embodiments described herein relate generally to Fibre Channel over Ethernet (FCoE) networks, and, in particular, to implementing a Fibre Channel zone policy in a FCoE network.

Some known FCoE networks use a Fibre Channel switch (e.g., a Fibre Channel Forwarder (FCF)) to connect server and/or storage devices and enforce a Fibre Channel zone policy. In such FCoE networks, server and/or storage devices are typically connected to and logged in with an FCF either directly or through an FCoE Initialization Protocol (FIP) snooping bridge. Meanwhile, FCoE frames are typically transmitted to the FCF before they can be forwarded to the destined server and/or storage devices. Because an FCF can only handle a limited number of devices and/or frames, however, such FCoE networks are typically not scalable.

Some other known FCoE networks implement a Virtual Node (VN) Port to VN Port (VN2VN) deployment, where each server or storage device is allowed to connect to and communicate with each other in a peer-to-peer fashion, without the presence of an FCF. In such a VN2VN deployment, however, a Fibre Channel zone policy is typically provisioned to and enforced at each server or storage device, resulting in an additional provisioning and enforcement overhead at each server or storage device.

Accordingly, a need exists for methods and apparatus that can implement a Fibre Channel zone policy in an FCoE network without introducing additional forwarding-plane state information at end nodes besides that used for FIP-snooping.

SUMMARY

In some embodiments, an apparatus includes a first network switch configured to be within a Fibre Channel over Ethernet (FCoE) network, which has a set of network switches including the first network switch. The first network switch is configured to receive, from a first network device, a login signal including a proposed logical identifier for the first network device. The first network switch is configured to send, in response to the login signal, a multicast signal including the proposed logical identifier to remaining network switches from the set of network switches. As a result, a second network switch from the set of network switches enforces a zone policy in response to receiving the multicast signal and prior to sending the proposed logical identifier to a second network device.

DETAILED DESCRIPTION

Figure 1:
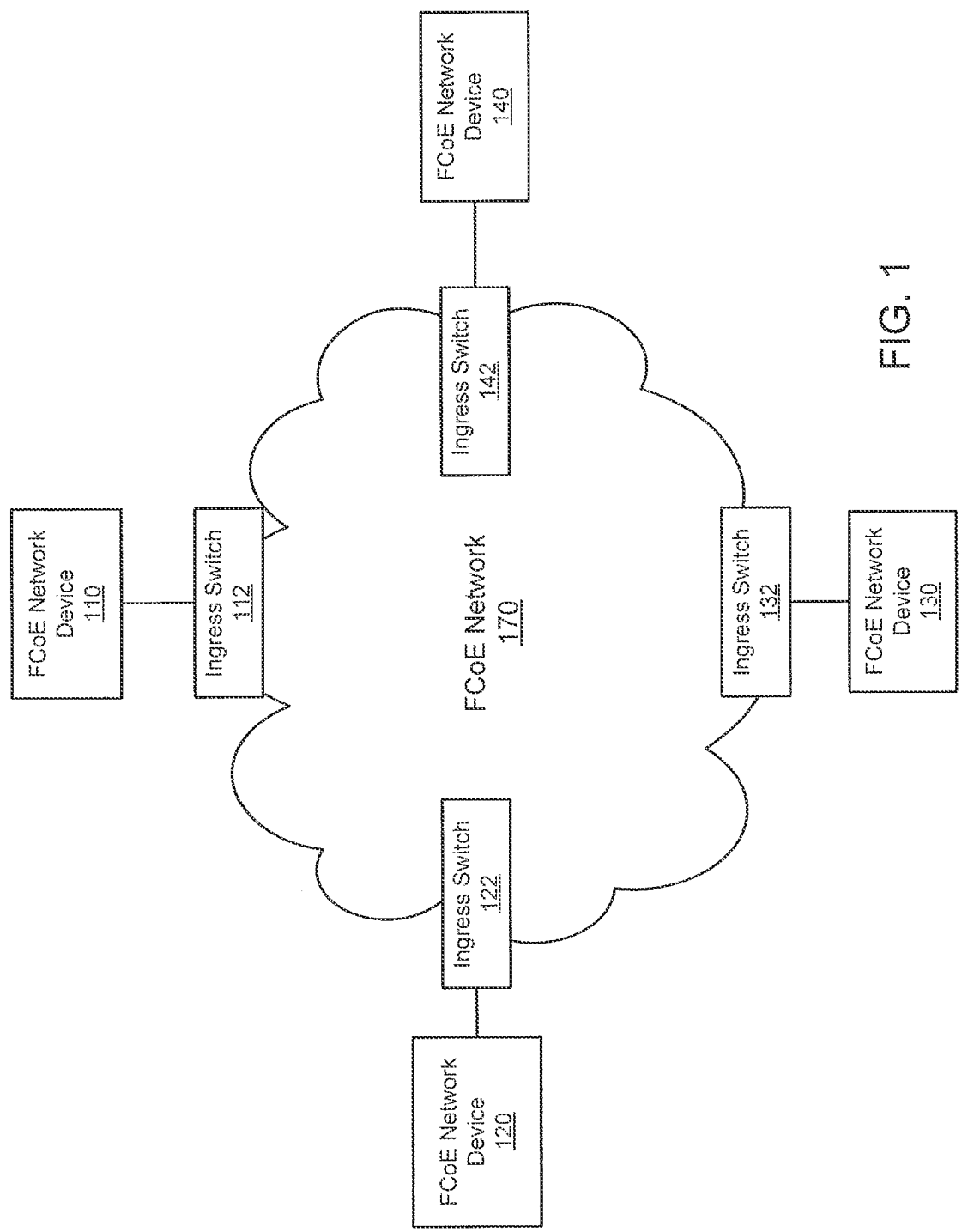
FIG. 1 is a schematic illustration of a FCoE network, according to an embodiment.

In some embodiments, an apparatus includes a first network switch configured to be within a Fibre Channel over Ethernet (FCoE) network, which has a set of network switches including the first network switch. The first network switch is configured to receive, from a first network device, a login signal including a proposed logical identifier for the first network device. In some embodiments, the proposed logical identifier for the first network device is selected by the first network device using a pseudo-random number generator. In some embodiments, the proposed logical identifier is an identifier of a Virtual Fibre Channel N-Port of the first network device. In some embodiments, the first network switch is configured to compare the proposed logical identifier with a set of logical identifiers within a database to determine a conflict between the proposed logical identifier and a logical identifier from the set of logical identifiers and associated with a second network device.

Furthermore, the first network switch is configured to send, in response to the login signal, a multicast signal including the proposed logical identifier to remaining network switches from the set of network switches. As a result, a second network switch from the set of network switches enforces a zone policy (e.g., using FIP-snooping filters) in response to receiving the multicast signal and prior to sending the proposed logical identifier to a third network device. In some embodiments, the first network device and the third network device are Virtual Node (VN) Port to VN Port (VN2VN) FCoE network devices. In some embodiments, the first network device is one of a storage device or a server. In some embodiments, the zone policy is based on a World Wide Name (WWN) associated with the first network device and a WWN associated with the third network device.

In some embodiments, upon receiving the multicast signal including the proposed logical identifier from the first network switch, a third network switch from the set of network switches refrains from sending the proposed logical identifier to a fourth network device based on the zone policy. In some embodiments, the first network switch is configured to receive, from the first network device, a data packet to be sent to a fifth network device. The first network switch is configured to enforce the zone policy (e.g., using FIP-snooping filters) to determine whether the first network device is authorized to send the data packet to the fifth network device.

In some embodiments, an apparatus includes a port at a first network switch configured to be within a FCoE network, which has a set of network switches including the first network switch. The port is configured to be operatively coupled to a network device. In some embodiments, the network device is a VN2VN FCoE network device. The port is configured to receive, at a first time and from the network device, a FCoE login signal including a proposed logical identifier selected by the network device. In some embodiments, the proposed logical identifier is selected by the network device using a pseudo-random number generator. In some embodiments, the proposed logical identifier is a proposed identifier of a Virtual Fibre Channel N-Port on the network device. The port is also configured to receive a FCoE data packet from the network device at a second time after the first time.

The apparatus also includes an address resolution module and a zone enforcement module, both operatively coupled to the port, at the first network switch. The address resolution module is configured to send a multicast signal including the proposed logical identifier to remaining network switches from the set of network switches. In some embodiments, the address resolution module is configured to compare the proposed logical identifier with a set of logical identifiers within a database to determine a conflict between the proposed logical identifier and a logical identifier from the set of logical identifiers of a second network device. The zone enforcement module is configured to enforce a Fibre Channel zone policy (e.g., using FIP-snooping filters) on the FCoE data packet. In some embodiments, the zone policy is based at least in part on a WWN associated with the network device.

As used in this specification, the singular forms "a," "an" and "the" include plural referents unless the context clearly dictates otherwise. Thus, for example, the term "a virtual node port" is intended to mean a single virtual node port or a combination and/or group of virtual node ports.

FIG. 1 is a schematic illustration of a FCoE network 170, according to an embodiment. As shown in FIG. 1, the FCoE network 170 includes ingress switches 112, 122, 132 and 142, each of which is connected to FCoE network device 110, 120, 130 and 140, respectively. The ingress switches 112, 122, 132 and 142 function as the ingress switches that couple the FCoE network device 110, 120, 130 and 140, respectively, to the FCoE network 170. Although not shown in FIG. 1, in some embodiments, an ingress switch can be connected to and function as an ingress switch for more than one network device. For example, ingress switch 122 can be operatively coupled to and function as an ingress switch for multiple FCoE network devices, including FCoE network device 120. In some embodiments, the FCoE network 170 can include any number of ingress switches, each of which can couple any number of network devices to the FCoE network 170. As described in further detail herein, some traditional functionality of source and/or destination FCoE network devices can be performed at and/or included in the ingress switches 112, 122, 132 and 142.

In some embodiments, the FCoE network 170 can be a FCoE layer-2 network (i.e., the data link layer of the Open Systems Interconnection (OSI) model, or the link layer of the Transmission Control Protocol (TCP)/Internet Protocol (IP) reference model). That is, network entities included in the FCoE network 170 are substantially layer-2 network devices configured to transmit data between network entities on the same local area network segment (i.e., layer-2 network segment). For example, the FCoE network 170 can be an Ethernet or a portion of an Ethernet, where devices in the FCoE network 170 are enabled to transmit Fibre Channel frames and/or packets within a local area network segment of the Ethernet. In some other embodiments, the FCoE network 170 can include layer-3 (i.e., the network layer of the OSI model, or the IP layer of the TCP/IP reference model) devices enabled to transmit data across multiple local area network segments.

In some embodiments, the FCoE network 170 can include a combination of hardware and/or software (executing on hardware) configured to transmit data between the FCoE network devices 110-140 via the corresponding ingress switch 112-142 and other network entities in the FCoE network 170. The FCoE network 170 can be, for example, a portion of a data center fabric, local area network (LAN), wide area network (WAN), storage area network (SAN), intranet, and/or the Internet. Although not shown in FIG. 1, in some embodiments, the FCoE network 170 can include one or more Fibre Channel-compatible servers and/or peripheral devices connected to one or more Fibre Channel switching devices (e.g., the ingress switches 112-142). Furthermore, the FCoE network 170 can include, for example, one or more Ethernet and Fibre Channel-compatible routers, line cards and/or network interface cards (NICs).

In some embodiments, the FCoE network 170 can include one or more subnetwork portions, such as one or more Fibre Channel zones and/or SANs. In some embodiments, the FCoE network 170 can include one or more devices and/or modules physically and/or operatively coupled via electrical cables, optical fiber cables, wireless connections, and/or any other suitable means of connection. As shown in FIG. 1, the FCoE network 170 can be coupled to the FCoE network devices 110-140 via the ingress switches 112-142. In such embodiments, the FCoE network 170 can thus exchange data with the FCoE network devices 110-140.

The FCoE network device 110, 120, 130, or 140 can be any device that can be coupled to the FCoE network 170 and communicate with other network devices via the FCoE network 170. Specifically, each FCoE network device 110-140 can include a combination of hardware and/or software (executing in hardware) capable of transmitting data to and/or receiving data from the corresponding ingress switch 112-142 that is connected to and functions as the ingress switch for that FCoE network device 110-140. Each FCoE network device 110-140 can send data to and/or receive data from each of the remaining FCoE network devices 110-140 via the FCoE network 170.

In some embodiments, the FCoE network device 110-140 can be a server device, a storage device, a computing device, a routing device, an application server, a database system, a gateway, a workstation and/or the like. The FCoE network devices 110-140 can optionally be, for example, compute nodes, service nodes, routers, and/or storage nodes. In some embodiments, the FCoE network devices 110-140 can perform one or more computing tasks, such as one or more data storage, software-as-a-service (SaaS), web service, content request, and/or other computing tasks. In some embodiments, each FCoE network device 110-140 can be a Fibre Channel-based device operatively or physically coupled to one or more other Fibre Channel-based devices, such as a Fibre Channel switch, a Fibre Channel fabric, a SAN, etc.

As shown in FIG. 1, each FCoE network device 110-140 is connected to the FCoE network 170 via an ingress switch 112-142. The ingress switch 112-142 can be any combination of hardware and/or software (executing in hardware) configured to perform switching of data (e.g., Fibre Channel frames) received from and/or sent to the FCoE network device 110-140. For example, the ingress switch 122 is situated between the FCoE network device 120 and other network entities (not shown in FIG. 1) within the FCoE network 170. The ingress switch 122 can be configured to perform, for example, switching tasks on Fibre Channel frames and/or packets transmitted between the FCoE network device 120 and the FCoE network device 110, 130, 140. In some embodiments, the ingress switch 112-142 can be referred to as the first-hop switch for the FCoE network device 110-140 that is coupled to that ingress switch 112-142.

Although not shown in FIG. 1, the ingress switch 122 can include one or more Fibre Channel ports, each of which is operatively or physically coupled to one of the Fibre Channel ports on the FCoE network device 120. In some embodiments, each of those Fibre Channel ports on the ingress switch 122 can be configured to exchange Fibre Channel frames with the corresponding Fibre Channel port on the FCoE network device 120. In some embodiments, as discussed herein, each of those Fibre Channel ports on the ingress switch 122 can be configured to exchange Fibre Channel frames with one or more virtual node ports of the FCoE network device 120, which are associated with the corresponding Fibre Channel port on the FCoE network device 120. Details of internal structure of an ingress switch are shown and described with respect to FIG. 2.

In some embodiments, each FCoE network device 110-140 can have one or more Fibre Channel ports (not shown in FIG. 1), each of which can be associated with one or more virtual node ports (not shown in FIG. 1). In some embodiments, a communication session can be established between a virtual node port of a FCoE network device 110-140 and a virtual node port of another FCoE network device 110-140, such that Fibre Channel data traffic can be transmitted between the two virtual node ports of the two FCoE network devices via the FCoE network 170. Specifically, via the corresponding ingress switches 112-142 for the two FCoE network devices 110-140 and other intervening network entities within the FCoE network 170, a data path can be defined between the two virtual node ports of the two FCoE network devices 110-140. Thus, Fibre Channel data packets and/or frames can be sent from the first virtual node port of the first FCoE network device, via the data path, to the second virtual node port of the second FCoE network device. In some embodiments, such a peer-to-peer communication between two FCoE network devices can be referred to as a VN2VN mode, and a FCoE network device capable of the VN2VN mode can be referred to as a VN2VN FCoE network device. In some embodiments, any number of virtual node ports of one or more FCoE network devices can be allowed to communicate with one another virtual node port of a FCoE network device in such a peer-to-peer communication without the presence of any central-controlling device such as, for example, a FCF.

For example, a virtual node port associated with the FCoE network device 120 can be configured to send data to and/or receive data from the ingress switch 122, which can be configured to send data to and/or receive data from the ingress switch 142 via a data path within the FCoE network 170 (e.g., including intervening network entities) that connects the ingress switch 122 and the ingress switch 142. Similarly to the ingress switch 122, the ingress switch 142 can be configured to send data to and/or receive data from a virtual node port of the FCoE network device 140. Thus, the virtual node port of the FCoE network device 120 can communicate with the virtual node port of the FCoE network device 140.

In some embodiments, the ingress switch 112-142 can be configured to perform initialization and/or login function for the FCoE network device 110-140 coupled to that ingress switch 112-142. Furthermore, the ingress switch 112-142 can be configured to implement a Fibre Channel zone policy. As a result, services such as device initialization, login, and/or data transmission between the corresponding FCoE network device 110-140 and other devices (e.g., other FCoE network device 110-140) coupled to the FCoE network 170 can be controlled by enforcing the Fibre Channel zone policy (e.g., using FIP-snooping filters). For example, the ingress switch 112-142 can be configured to implement a FCoE filter to allow the corresponding FCoE network device 110-140 to communicate with only those remaining FCoE network devices 110-140 that are allowed, by the Fibre Channel zone policy, to communicate with that FCoE network device 110-140. Details of performing initialization, login, data transmission, and implementing a Fibre Channel zone policy at an ingress switch are shown and described with respect to FIGS. 2-4.

Figure 2:
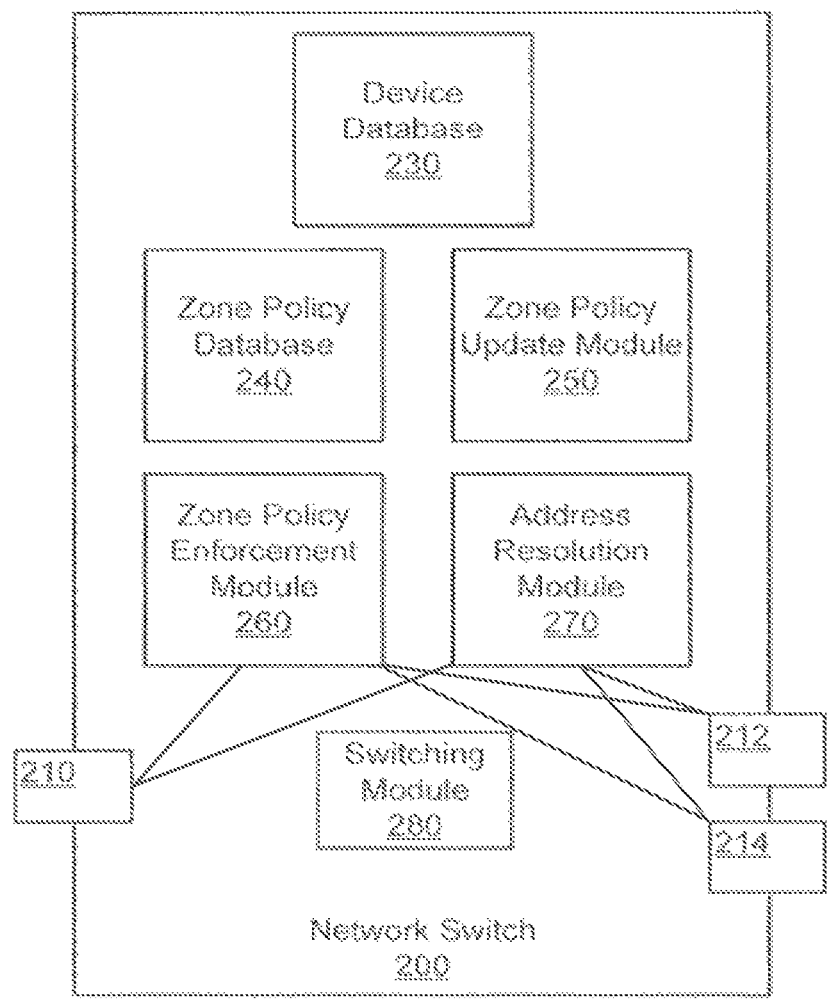
FIG. 2 is a schematic illustration of a network switch in a FCoE network, according to an embodiment.

FIG. 2 is a schematic illustration of a network switch in a FCoE network, according to an embodiment. More specifically, FIG. 2 is a system block diagram of a network switch 200 substantially similar to the ingress switch 112-142 shown and described in connection with FIG. 1 above, according to an embodiment. The network switch 200 includes a device database 230, a zone policy database 240, a zone policy update module 250, a zone policy enforcement module 260 (e.g., including FIP-snooping filters), an address resolution module 270, a switching module 280, and ports 210, 212, 214. In some embodiments, although not shown in FIG. 2, the network switch 200 can also include at least a processor configured to execute the functions provided by the various modules, a memory configured to store information and/or data related to executing those functions, and/or any other module(s).

In some embodiments, similar to the ingress switch 112-142 in FIG. 1, the network switch 200 can be situated at the boundary of a FCoE network (not shown in FIG. 2) that hosts the network switch 200. Such a FCoE network can be structurally and functionally similar to the FCoE network 170 shown and described with respect to FIG. 1. Specifically, the network switch 200 can be configured to connect one or more FCoE network devices (e.g., the FCoE network device 110-140 in FIG. 1) to one or more network entities from the remaining portion of the FCoE network. For example, the port 210 can be connected to a Fibre Channel port of a FCoE network device, and port 212, 214 can be respectively connected to ports of one or more network entities (e.g., a switching device, a server device, a storage device, etc.) within the FCoE network.

In some embodiments, although not shown in FIG. 2, one or more ports of the network switch 200 can be included in a line card. For example, the port 212, 214 can be included in a line card. In some embodiments, the network switch 200 can be coupled with other network entities or FCoE network devices via, for example, electrical cables, optical fiber cables, wireless connections, and/or any other suitable means of connection. In such embodiments, the port 210, 212, 214 can be a port with the appropriate hardware and/or software (executing in hardware) configuration that is enabled to handle transmitting data over the specific means of connection.

In some embodiments, the port 210, 212, 214 can function as an ingress port and/or an egress port for the network switch 200. That is, the network switch 200 can be configured to receive data (e.g., Fibre Channel packets or frames) from and/or send data to a FCoE network device or any other network entity (e.g., within the FCoE network that hosts the network switch 200) via the port 210, 212, 214. For example, the network switch 200 can be configured to receive data from and send data to, via the port 210, a FCoE network device connected to the port 210. For another example, the network switch 200 can be configured to receive data from and send data to, via the port 212 or 214, a network entity connected to the port 212 or 214 that is within the FCoE network.

In some embodiments, the zone policy update module 250, the zone policy enforcement module 260, the address resolution module 270 and the switching module 280 can each include a combination of hardware and/or software (executing in hardware) configured to execute a specific function associated with that module, as described in detail below. Those modules can be executed by, for example, a processor (not shown in FIG. 2) of the network switch 200. In some embodiments, the device database 230 and the zone policy database 240 can be included in a memory (not shown in FIG. 2) within the network switch 200. The databases can be accessed, modified or updated by one or more of the modules, as described in detail below. Furthermore, although not shown in FIG. 2, the modules and the databases can be operatively coupled to the port 210, 212, 214, or at least one of the remaining modules or databases. Details of operations of the modules within the network switch 200 are further described with respect to FIGS. 3-4.

The device database 230 can store information and/or data related to FCoE network devices connected to and actively logged-in with the FCoE network that hosts the network switch 200. The FCoE network devices include the FCoE network device(s) that use the network switch 200 as their ingress switch (e.g., physically connected to the network switch 200), as well as the FCoE network device(s) that use other network switches as their ingress switch (e.g., physically connected to other network switches and thus operatively coupled to the network switch 200 via the FCoE network). In some embodiments, the device database 230 can store information of all the FCoE network devices that are connected to and actively logged-in with the FCoE network. In some embodiments, the information and/or data of the FCoE network devices stored in the device database 230 is the same as that stored in any other device database within another network switch in the FCoE network. Thus, every network switch in the FCoE network can be aware of every FCoE network device that is connected to and actively logged-in with the FCoE network.

In some embodiments, the information stored in the device database 230 can include a logical identifier and a World Wide Name (WWN) of each FCoE network device connected to and actively logged-in with the FCoE network. The WWN is a unique identifier that can identify a particular Fibre Channel device such as a FCoE network device. The WWN for a Fibre Channel device can be, for example, an 8-byte number derived from an Institute of Electrical and Electronics Engineers (IEEE) Organizationally Unique Identifier (OUI) and vendor-supplied information associated with that Fibre Channel device. In some embodiments, a WWN can also be referred to as a World Wide Identifier (WWID).

In some embodiments, the logical identifier for a FCoE network device can be an address used to uniquely represent that FCoE network device. In some embodiments, the logical identifier for a FCoE network device can be selected by that FCoE network device using, for example, a pseudo-random number generator. For instance, a logical identifier for a FCoE network device can be in the format of "0.x.y", where each of x and y is an integer between 0 and 255 (including 0 and 255), and the 0 at the first digit represents that such an address is reserved for a FCoE network device in the VN2VN mode. For example, a FCoE network device can have a logical identifier "0.10.100", and another FCoE network device can have a logical identifier "0.62.215". Alternatively, in some other embodiments, the logical identifier for a FCoE network device can be in any other suitable format.

In some embodiments, the logical identifier for a FCoE network device can be an identifier for a virtual node port of that FCoE network device. A virtual node port of a Fibre Channel device can also be referred to as a virtual Fibre Channel N-port. For example, the device database 230 can store a first logical identifier associated with a virtual node port of a FCoE network device (e.g., the FCoE network device 110-140 in FIG. 1), and a second logical identifier associated with another virtual node port of the same FCoE network device. Thus, in such embodiments, multiple logical identifiers associated with a single FCoE network device can be stored in the device database 230.

In some embodiments, the device database 230 can store and/or maintain associations between the logical identifiers, the WWNs, and/or other related information of the FCoE network devices. For example, the logical identifier and WWN of each FCoE network device can be stored in the same entry of a list of FCoE network devices within the device database 230, such that the logical identifier of a FCoE network device can be associated with the WWN of that FCoE network device, and such an association can be determined by looking up the appropriate entry of the list of FCoE network devices in the device database 230.

The address resolution module 270 can be configured to detect any conflict between logical identifiers in response to receiving a proposed logical identifier from a FCoE network device. Specifically, the network switch 200 can receive a signal including a proposed logical identifier and/or other related information (e.g., the WWN) of a FCoE network device that is connected to the FCoE network and activated. The FCoE network device can be directly coupled to the network switch 200 and use the network switch 200 as its ingress switch. In such a case, the signal received at the network switch 200 can be a unicast signal sent from the FCoE network device. Alternatively, the FCoE network switch can be operatively coupled to the network switch 200 via, for example, other network entities in the FCoE network, and use another network switch as its ingress switch. In such a case, the signal received at the network switch 200 can be a multicast signal sent from the ingress switch associated with that FCoE network device.

In response to receiving such a signal, the address resolution module 270 can be configured to determine whether a conflict exists between the proposed logical identifier and a logical identifier stored in the device database 230. Specifically, the address resolution module 270 can be configured to compare the proposed logical identifier with the logical identifier(s) stored in the device database 230 that are associated with other device(s) (e.g., other FCoE network device(s)) that are already connected to and logged-in with the FCoE network.

If a conflict between logical identifiers is detected (that is, if the proposed logical identifier is determined to be identical to a logical identifier of another device stored in the device database 230), the address resolution module 270 is configured to send a signal to the FCoE network device that originated the signal for the proposed logical identifier, indicating that the logical identifier proposed by that FCoE network device has already been taken and therefore is not available.

Otherwise, if the proposed logical identifier is determined to be different than every logical identifier for other devices stored in the device database 230, no conflict between logical identifiers is detected. If the network switch 200 is the ingress switch for the FCoE network device (i.e., the network switch receives the proposed logical identifier from the FCoE network device without intervening ingress switch (es)), then the address resolution module 270 can be configured to send the proposed logical identifier as well as other related information (e.g., the WWN of the FCoE network device), using a multicast signal, to other network switches within the FCoE network that function as an ingress switch for other devices (e.g., other FCoE network devices). As a result, the other network switches can be configured to enforce a Fibre Channel zone policy and (optionally) check conflict in response to receiving the multicast signal and prior to forwarding the proposed logical identifier to the other devices. If the network switch 200 is not the ingress switch for the FCoE network device (i.e., the network switch receives the proposed logical identifier from the ingress switch for the FCoE network device), then the zone policy enforcement module 260 can be configured to enforce a Fibre Channel zone policy at the network switch 200 (e.g., using FIP-snooping filters) prior to forwarding the proposed logical identifier to the device(s) and/or switch(es) coupled to the network switch 200.

In some embodiments, in both cases (i.e., the network switch 200 being the ingress switch for the FCoE network device or not), the device database 230 can be updated accordingly, such that the proposed logical identifier as well as other related information (e.g., the WWN) of the FCoE network device can be (temporarily) stored in the device database 230.

The zone policy database 240 can store a Fibre Channel zone policy associated with the devices (e.g., FCoE network devices) connected to and potentially connected to the FCoE network that hosts the network switch 200. A Fibre Channel zone policy can define, for example, one or multiple zones for Fibre Channel network devices, such that two Fibre Channel network devices can communicate with each other if and only if both of them are included in the same zone. In some embodiments, the Fibre Channel zone policy stored in the zone policy database 240 is the same as the Fibre Channel zone policy stored within any other network switch across the FCoE network that functions as an ingress switch for a FCoE network device. Thus, a universal Fibre Channel zone policy can be enforced at every ingress switch within the FCoE network. For example, as shown in FIG. 1, a universal Fibre Channel zone policy can be stored in a zone policy database (e.g., the zone policy database 240) of each ingress switch 112-142 and enforced at that ingress switch 112-142.

In some embodiments, the Fibre Channel zone policy stored in the zone policy database 240 can be based at least in part on a unique identifier of the Fibre Channel network device(s), such as the WWN of the Fibre Channel network device(s). For example, the Fibre Channel zone policy can be defined such that a first Fibre Channel network device with a first WWN "2x:xx:00:C0:DD:11:22:33" and a second Fibre Channel network device with a second WWN "2x:xx:00:C0:DD:44:55:66" are included in the same zone, while a third Fibre Channel network device with a third WWN "2x:xx:00:C0:DD:77:88:99" is included in a different zone. In such embodiments, the Fibre Channel zone policy stored in the zone policy database 240 is typically not based on the logical identifiers associated with the Fibre Channel network devices.

The zone policy update module 250 can be configured to update the Fibre Channel zone policy stored in the zone policy database 240. In some embodiments, a new Fibre Channel zone policy can be injected into a network entity within the FCoE network by, for example, a network administrator, and then distributed to each network switch. In response to receiving such a new Fibre Channel zone policy, the zone policy update module 250 can be configured to store the new Fibre Channel zone policy into the zone policy database 240, and (optionally) overwrite the existing Fibre Channel zone policy previously stored in the zone policy database 240. In some other embodiments, the Fibre Channel zone policy stored in the zone policy database 240 can be updated by any other suitable means. For example, the Fibre Channel zone policy stored at each network switch can be manually updated by, for example, a network administrator.

The zone policy enforcement module 260 can be configured to enforce the Fibre Channel zone policy stored in the zone policy database 240 on data, signals and/or messages received at the network switch 200, in various scenarios (e.g., using FIP-snooping filters). In some embodiments, the network switch 200 can receive, for example, a multicast signal from another network switch (e.g., through intervening network entities within the FCoE network). The multicast signal can include a logical identifier proposed for a remote FCoE network device (i.e., a FCoE network device not directly connected to the network switch 200 and not using the network switch 200 as its ingress switch), as well as other related information (e.g., the WWN) of that FCoE network device.

In response to receiving such a proposed logical identifier for the remote FCoE network device, the zone policy enforcement module 260 can be configured to enforce the Fibre Channel zone policy stored in the zone policy database 240 (e.g., using FIP-snooping filters) to determine whether the proposed logical identifier for the remote FCoE network device should be forwarded to the local FCoE network device(s) (i.e., the FCoE network device(s) that are connected to the network device 200 and using the network switch 200 as their ingress switch). That is, the zone policy enforcement module 260 can be configured to determine whether the network switch 200 is authorized to send the proposed logical identifier and/or other information of the remote FCoE network device to the local FCoE network device(s) according to the Fibre Channel zone policy stored in the zone policy database 240.

Specifically, the zone policy enforcement module 260 can be configured to determine whether the remote FCoE network device and the local FCoE network device(s) are included in the same zone or not, by examining the Fibre Channel zone policy stored in the zone policy database 240. If the remote FCoE network device and a local FCoE network device are determined to be included in the same zone, the network switch 200 is thus authorized to send the proposed logical identifier and/or other related information of the remote FCoE network device to the local FCoE network device. Accordingly, the switching module 280 can be configured to send the proposed logical identifier and/or other related information of the remote FCoE network device to the local FCoE network device via a port of the network switch (e.g., port 212) that is coupled to that local FCoE network device. Otherwise, if the remote FCoE network device and a local FCoE network device are determined to be not included in the same zone, the network switch 200 is thus not authorized to send the proposed logical identifier and/or other related information of the remote FCoE network device to the local FCoE network device. Accordingly, the network switch 200 can be configured to not forward and (optionally) drop the proposed logical identifier and/or other related information of the remote FCoE network device.

In some other embodiments, the network switch 200 can receive, for example, a multicast signal from another network switch, which includes a logical identifier designated for a remote FCoE network device, as well as other related information (e.g., the WWN) of that FCoE network device. As described with respect to FIG. 3, after a FCoE network device proposes a logical identifier for itself and receives no conflict response within a predetermined period of time, the FCoE network device can be configured to broadcast that logical identifier, as a logical identifier designated for that FCoE network device, across the FCoE network.

In response to receiving such a designated logical identifier for the remote FCoE network device, the zone policy enforcement module 260 can be configured to enforce the Fibre Channel zone policy stored in the zone policy database 240 (e.g., using FIP-snooping filters) to determine whether the designated logical identifier for the remote FCoE network device should be forwarded to the local FCoE network device(s) associated with the network device 200. That is, the zone policy enforcement module 260 can be configured to determine whether the network switch 200 is authorized to send the designated logical identifier and/or other information of the remote FCoE network device to the local FCoE network device(s) according to the Fibre Channel zone policy stored in the zone policy database 240.

Similar to the previous instance of a proposed logical identifier, the zone policy enforcement module 260 can be configured to determine whether the remote FCoE network device and the local FCoE network device(s) are included in the same zone or not, by examining the Fibre Channel zone policy stored in the zone policy database 240. If the remote FCoE network device and a local FCoE network device are determined to be included in the same zone, the network switch 200 is thus authorized to send the designated logical identifier and/or other related information of the remote FCoE network device to the local FCoE network device. Accordingly, the switching module 280 can be configured to send the designated logical identifier and/or other related information of the remote FCoE network device to the local FCoE network device via a port of the network switch that is coupled to that local FCoE network device. Otherwise, if the remote FCoE network device and a local FCoE network device are determined to be not included in the same zone, the network switch 200 is thus not authorized to send the designated logical identifier and/or other related information of the remote FCoE network device to the local FCoE network device. Accordingly, the network switch 200 can refrain from sending the designated logical identifier and/or other related information of the remote FCoE network device to the local FCoE network device.

Additionally, regardless of the network switch 200 being authorized to send information of the remote FCoE network device to any local FCoE network device or not, the network switch 200 can be configured to update, for example, a list of FCoE network devices stored in the device database 230. Thus, the designated logical identifier, the WWN, and/or other related information of the remote Fibre Channel network device can be added into the list of FCoE network devices stored in the device database 230.

In yet some other embodiments, the network switch 200 can receive data (e.g., Fibre Channel frames or packets) originated from a first FCoE network device (e.g., a local FCoE network device, a remote FCoE network device) that is destined to a second FCoE network device. In response to receiving such data, the zone policy enforcement module 260 can be configured to enforce the Fibre Channel zone policy stored in the zone policy database 240 (e.g., using FIP-snooping filters) to determine whether the data originated from the first FCoE network device should be forwarded to the second FCoE network device. That is, the zone policy enforcement module 260 can be configured to determine whether the network switch 200 is authorized to send the data originated from the first FCoE network device to the second FCoE network device according to the Fibre Channel zone policy stored in the zone policy database 240.

Similar to the previous instance of a proposed logical identifier or a designated logical identifier, the zone policy enforcement module 260 can be configured to determine whether the first FCoE network device and the second FCoE network device are included in the same zone or not, by examining the Fibre Channel zone policy stored in the zone policy database 240. If the first FCoE network device and the second FCoE network device are determined to be included in the same zone, the network switch 200 is thus authorized to send the data originated from the first FCoE network device to the second FCoE network device. Accordingly, the switching module 280 can be configured to determine which port of the network switch 200 is coupled (physically or operatively) to the second FCoE network switch, and then send the data out of that port accordingly. Otherwise, if the first FCoE network device and the second FCoE network device are determined to be not included in the same zone, the network switch 200 is thus not authorized to send the data originated from the first FCoE network device to the second FCoE network device. Accordingly, the network switch 200 can be configured to drop the data.

The switching module 280 can be configured to perform typical network switching functions on data (e.g., Fibre Channel frames and/or packets), signals, and/or messages received at the network switch 200. The switching module 280 can, for example, send a received Fibre Channel frame to an appropriate next-hop device (e.g., a network entity in the FCoE network, a FCoE network device) via a port of the network switch 200 that is coupled to that next-hop device. In some embodiments, the switching module 280 can be configured to send data originated from a virtual node port of a FCoE network device to an appropriate next-hop device via a port of the network switch 200, such that the data can be forwarded to a destined virtual node port of another FCoE network device. Thus, the network switch 200 can implement the VN2VN protocol and enable communications between virtual node ports of FCoE network devices. Furthermore, as described herein, the switching module 280 can be configured to send information associated with initialization and/or login of a FCoE network device, including messages containing a proposed logical identifier or a designated logical identifier, to an appropriate next-hop device coupled to the network switch 200.

Figure 3:
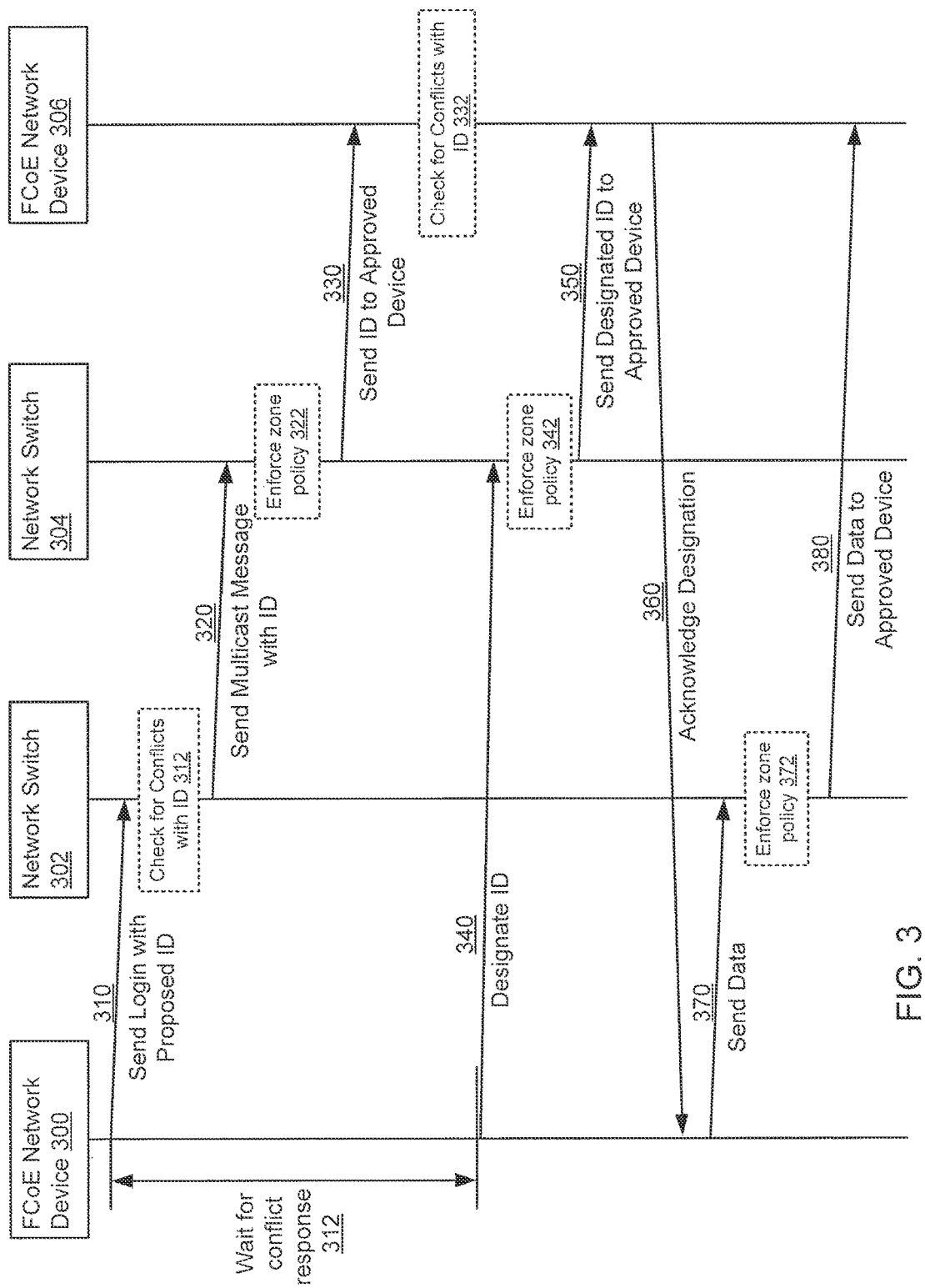
FIG. 3 is a logical representation of two FCoE network devices establishing a connection via two network switches, according to an embodiment.

FIG. 3 is a logical representation of two FCoE network devices (i.e., FCoE network device 300, 306) establishing a connection via two network switches (i.e., network switch 302, 304), according to an embodiment. The FCoE network devices 300 and 306 can be structurally and functionally similar to the FCoE network device 110-140 described with respect to FIG. 1. In some embodiments, the FCoE network devices 300 and 306 can be VN2VN FCoE network devices. Similarly, the network switches 302 and 304 can be structurally and functionally similar to the network switch 200 described with respect to FIG. 2. Furthermore, the network switches 302 and 304 can be included in a FCoE network (e.g., the FCoE network 170 in FIG. 1). The network switch 302 can be the ingress switch for the FCoE network device 300. That is, the network switch 302 can couple the FCoE network device 300 to other network entities (e.g., other network switches) within the FCoE network. Similarly, the network switch 304 can be the ingress switch for the FCoE network device 306. Although not shown in FIG. 3, in some embodiments, one or more network entities can be present intervening between the network switch 302 and the network switch 304. In such embodiments, the network switch 302 and the network switch 304 can communicate with each other via a data path connecting the two network switches through those intervening network entities.

Initially, after the FCoE network device 300 is connected to the network switch 302 and activated (e.g., turned on), the FCoE network device 300 can be configured to generate a logical identifier. In some embodiments, such a logical identifier can be generated by the FCoE network device 300 without assistance from any other network entity including the network switch 302 and any other network entity within the FCoE network. Similar to the logical identifiers described with respect to FIG. 2, the logical identifier generated by the FCoE network device 300 can be intended or presumed to be a unique address for the FCoE network device 300, which can potentially be used within the FCoE network. In some embodiments, the logical identifier can be selected by the FCoE network device 300 using, for example, a pseudo-random number generator. In such embodiments, the logical identifier can be generated based on, for example, a unique identifier (e.g., the WWN) of the FCoE network device 300 that is used as an input to the pseudo-random number generator. Additionally, in some embodiments, the logical identifier can be associated with a virtual node port of the FCoE network device 300. Such a logical identifier can be used to represent the virtual node port of the FCoE network device 300 in a VN2VN protocol.

After the logical identifier is generated at the FCoE network device 300, the FCoE network device 300 can be configured to send a login signal to the network switch 302, shown as signal 310 in FIG. 3. The login signal can include the logical identifier as a proposed logical identifier for the FCoE network device 300. The login signal can also include other related information (e.g., the WWN) associated with the FCoE network device 300, such that the network switch 302 can be aware from which device the login signal is sent.

In response to receiving the login signal, the network switch 302 can be configured to check for conflict between the proposed logical identifier included in the login signal and the logical identifier(s) stored within the network switch 302, as shown in step 312 in FIG. 3. For example, an address resolution module (e.g., the address resolution module 270 in FIG. 2) of the network switch 302 can be configured to compare the proposed logical identifier for the FCoE network device 300 with the logical identifier(s) stored within the network switch 302. The logical identifier(s) can be associated with other device(s) (e.g., other FCoE network device(s)) that are already connected to and logged-in with the FCoE network, and can be stored in, for example, a device database (e.g., the device database 230 in FIG. 2) within the network switch 302.

If a conflict between logical identifiers is detected (i.e., the proposed logical identifier for the FCoE network device 300 is determined to be identical to a logical identifier of another device stored in the device database within the network switch 302), the network switch 302 can be configured to send a conflict response signal (not shown in FIG. 3) to the FCoE network device 300 indicating that the proposed logical identifier is already taken. In response to receiving such a conflict response signal, the FCoE network device 300 can be configured to generate another logical identifier, and then repeat the previous procedures to send a new login signal including the new logical identifier to the network switch 302. The network switch 302 can then repeat the step 312 to check for conflict for that new logical identifier.

Otherwise, if no conflict between logical identifiers is detected (i.e., the proposed logical identifier for the FCoE network device 300 is determined to be different than every logical identifier for other devices stored in the device database within the network switch 302), the network switch 302 can be configured to send a message (e.g., a multicast message, a broadcast message) to other network switches in the FCoE network that function as an ingress switch for other FCoE network devices. The multicast message or broadcast message can include at least the proposed logical identifier for the FCoE network device 300, and/or other related information (e.g., the WWN) of the FCoE network device 300. Shown as signal 320 in FIG. 3, a multicast message including the proposed logical identifier for the FCoE network device 300 can be sent from the network switch 302 to the network switch 304 via, for example, a multi-hop data path. Although not shown in FIG. 3, such a multicast message or a broadcast message can also be sent from the network switch 302 to a portion or all of the remaining network switches within the FCoE network in a similar way. In some embodiments, the multicast message or broadcast message can be transmitted to those network switches via, for example, a single physical hop or multiple physical hops (i.e., through intervening network entities within the FCoE network).

In response to receiving a message including the proposed logical identifier and/or other information associated with the FCoE network device 300, the network switch 304 can be configured to enforce a Fibre Channel zone policy (e.g., using FIP-snooping filters) to determine whether the received message should be forwarded to FCoE network device 306 or not, shown as step 322 in FIG. 3. In some embodiments, the Fibre Channel zone policy enforced at the network switch 304 or any other network switch can be based on, for example, the WWNs associated with the corresponding FCoE network devices (e.g., the FCoE network device 300, 306).

Specifically, the network switch 304 can be configured to determine whether the FCoE network device 300 and the FCoE network device 306 are included in the same zone or not by examining the Fibre Channel policy stored within the network switch 304. If the FCoE network device 300 and the FCoE network device 306 are determined to be included in the same zone, the FCoE network device 306 is an approved device that can communicate with the FCoE network device 300, and vice versa. As a result, the network switch 304 is authorized to send the proposed logical identifier and/or other related information of the FCoE network device 300 to the FCoE network device 306, shown as signal 330 in FIG. 3. Otherwise, if the FCoE network device 300 and the FCoE network device 306 are determined to be not included in the same zone, the FCoE network device 306 is not an approved device with respect to the FCoE network device 300, and vice versa. As a result, the network switch 304 is not authorized to send the proposed logical identifier and/or other related information of the FCoE network device 300 to the FCoE network device 306. Accordingly, the network switch 304 can refrain from forwarding the proposed logical identifier and/or any other related information of the FCoE network device 300 to the FCoE network device 306.

In some embodiments, although not shown in FIG. 3, the network switch 304 can be connected to and function as the ingress switch for more than one FCoE network device (including the FCoE network device 306). In such embodiments, the network switch 304 can be configured to determine, for each FCoE network device connected to the network switch 304, whether that FCoE network device is an approved device with respect to the FCoE network device 300 (in other words, whether that FCoE network device is included in the same zone as the FCoE network device 300). As a result, the network switch 304 can be configured to forward the proposed logical identifier and/or other related information of the FCoE network device 300 to each approved FCoE network device connected to the network switch 304, while refraining from doing so for each unapproved FCoE network device. In some embodiments, if no approved device with respect to the FCoE network device 300 is determined, the network switch 304 can be configured to drop the proposed logical identifier and/or other related information of the FCoE network device 300.

In some embodiments, as described above with respect to FIG. 2, the Fibre Channel zone policy can be stored in, for example, a zone policy database (e.g., the zone policy database 240) within the network switch 304. The Fibre Channel zone policy can be enforced by, for example, a zone policy enforcement module (e.g., the zone policy enforcement module 260) of the network switch 304 (e.g., using FIP-snooping filters). The Fibre Channel zone policy stored within the network switch 304 can be updated by, for example, a zone policy update module (e.g., the zone policy update module 250) in the network switch 304. Additionally, a switching module (e.g., the switching module 280) of the network switch 304 can be configured to send the proposed logical identifier and/or other related information of the FCoE network device 300 to the FCoE network device 306 via an appropriate port of the network switch 304, which is coupled to the FCoE network device 306.

In response to receiving the proposed logical identifier of the FCoE network device 300, the FCoE network device 306 can be configured to check for conflict between its own logical identifier and the received logical identifier, shown as step 332 in FIG. 3. Similar to the network switch 302, if a conflict between the two logical identifiers is detected (i.e., the proposed logical identifier for the FCoE network device 300 is determined to be identical to the logical identifier associated with the FCoE network device 306), the FCoE network device 306 can be configured to send a conflict response signal (not shown in FIG. 3) to the FCoE network device 300 indicating that the proposed logical identifier is already taken or assigned. In response to receiving such a conflict response signal, the FCoE network device 300 can be configured to generate another logical identifier, and then repeat the previous procedures check for any potential conflict.

In some embodiments, although not shown in FIG. 3, the network switch 304 can also be configured to check for conflicts between logical identifiers in a similar fashion as the network switch 302. In some embodiments, if conflicts between logical identifiers are checked at the network switch 302, or the network switch 304, or both, then checking for conflicts between logical identifiers at the FCoE network device 306 can be omitted. For example, the proposed logical identifier for the FCoE network device 300 is not necessarily sent to the FCoE network device 306, and checking for conflicts between logical identifiers is not necessarily operated at the FCoE network device 306. In such embodiments, the FCoE network device 306 can be designed and/or configured in such a way that checking for conflicts between logical identifiers is not a prerequisite for being engaged in communication with another FCoE network device. That is, the FCoE network device 306 need not check conflicts between logical identifiers with respect to another FCoE network device (e.g., the FCoE network device 300) to enable the FCoE network device 306 to communicate with that FCoE network device. On the other hand, if a given VN2VN protocol requires that checking for conflicts between logical identifiers is a prerequisite for a FCoE network device to be engaged in communication with another FCoE network device, then the FCoE network device 306 should receive the proposed logical identifier for the FCoE network device 300, as shown in FIG. 3. In such embodiments, the FCoE network device 306 can be any generic network device that is compliant with that given VN2VN protocol.

In some embodiments, after the FCoE network device 300 sends the login signal to the network switch 302, the FCoE network device 300 can be configured to wait a predetermined period of time for conflict response, shown as step 312 in FIG. 3. If a conflict response signal is received during the predetermined period of time, the FCoE network device 300 can be configured to generate a different logical identifier, and then repeat the procedures 310-332 described above.

Otherwise, if no conflict response signal is received during the predetermined period of time, the FCoE network device 300 can assume that no conflict exists between its proposed logical identifier and any logical identifier currently existing in the FCoE network. Thus, the FCoE network device 300 can designate that proposed logical identifier as its logical identifier, and broadcast this designated logical identifier to other network entities across the FCoE network. Specifically, the FCoE network device 300 can be configured to send a signal including the designated logical identifier and/or other related information (e.g., the WWN) of the FCoE network device 300 to the network switch 302. The network switch 302 can then forward the signal to every other network switch that functions as an ingress switch for other devices in the FCoE network. In some embodiments, the signal propagating the designated logical identifier can be a multicast signal destined to all the ingress switches in the FCoE network. In some other embodiments, the signal can be a broadcast signal. In such embodiments, every network entity in the FCoE network can receive the signal containing the designated logical identifier for the FCoE network device 300. As shown in FIG. 3, the FCoE network device 300 can be configured to send the signal 340, which includes the designated logical identifier for the FCoE network device 300, to the network switch 302 and the network switch 304 (forwarded from the network switch 302).

In response to receiving such a signal containing the designated logical identifier for the FCoE network device 300, the network switch 304 can be configured to enforce the Fibre Channel zone policy to determine whether to forward the designated logical identifier for the FCoE network device 300 to the FCoE network device 306 or not, shown as step 342 in FIG. 3. Similar to the previous procedure with the proposed logical identifier for the FCoE network device 300 (shown as step 322 in FIG. 3), the network switch 304 can determine whether the FCoE network device 300 and 306 are included in the same Fibre Channel zone or not, based on the Fibre Channel zone policy stored at the network switch 304. If the FCoE network devices 300 and 306 are determined to be included in the same zone, the network switch 304 can be configured to send the designated logical identifier and/or other related information of the FCoE network device 300 to the FCoE network device 306, shown as the signal 350 in FIG. 3. Otherwise, if the FCoE network devices 300 and 306 are determined to be not included in the same zone, the network switch 304 can refrain from sending the designated logical identifier or any other related information of the FCoE network device 300 to the FCoE network device 306.

Additionally, in some embodiments, each network switch can be configured to store the designated logical identifier for the FCoE network device 300 in response to receiving the signal containing the designated logical identifier for the FCoE network device 300. For example, although not shown in FIG. 3, the network switch 302 and the network switch 304 can be configured to store the designated logical identifier as well as other related information (e.g., the WWN) of the FCoE network device 300 into, for example, a device database (e.g., the device database 230 in FIG. 2) within the network switch 302 or the network switch 304, respectively.

In response to receiving the designated logical identifier and/or other related information of the FCoE network device 300, the FCoE network device 306 can be configured to send an acknowledgement signal to the FCoE network device 300, shown as the signal 360 in FIG. 3. Specifically, the acknowledgement signal can be first sent from the FCoE network device 306 to the network switch 304, then forwarded from the network switch 304 to the network switch 302 (e.g., via any intervening network entity not shown in FIG. 3), and finally sent from the network switch 302 to the FCoE network device 300. Such an acknowledgement signal can indicate to the FCoE network device 300 that the FCoE network device 306 has successfully received the designated logical identifier for the FCoE network device 300.

After the FCoE network device 306 receives the designated logical identifier for the FCoE network device 300 and the FCoE network device 300 receives the acknowledgement signal from the FCoE network device 306, the FCoE network device 300 and 306 can be engaged in transmitting data (e.g., Fibre Channel frames or packets) directly in a peer-to-peer fashion. Furthermore, in some embodiments, data can be transmitted between a virtual node port of the FCoE network device 300 and a virtual node port of the FCoE network device 306 according to a VN2VN protocol.

In the example of FIG. 3, the FCoE network device 300 can be configured to send a Fibre Channel data packet to the network switch 302 (shown as the signal 370 in FIG. 3). In this example, the data packet can be originated at a virtual node port of the FCoE network device 300 and destined to a virtual node port of the FCoE network device 306. In some embodiments, the logical identifier for the virtual node port of the FCoE network device 300 can be included in the data packet as the source address, and the logical identifier for the virtual node port of the FCoE network device 306 can be included in the data packet as the destination address. In some embodiments, addresses associated with the FCoE network device 300 and 306, such as the WWNs for the FCoE network device 300 and 306, can also be included in the data packet.

In response to receiving the data packet, the network switch 302 can be configured to enforce the Fibre Channel zone policy on the data packet, as shown in step 372 in FIG. 3 (e.g., using FIP-snooping filters). For example, the network switch 302 can first determine the logical identifiers that are the source and destination addresses included in the data packet. Based on those logical identifiers, the network switch 302 can then determine the WWNs of the source and destination devices (i.e., the FCoE network device 300 and 306) by, for example, looking up a device database in the network switch 302. The logical identifiers and WWNs for the FCoE network devices 300 and 306 can be stored and associated in the device database. Based on the WWNs for the FCoE network devices 300 and 306, the network switch 302 can determine whether the FCoE network devices 300 and 306 are included in the same zone according to the Fibre Channel zone policy stored in the network switch 302. As described herein, such a Fibre Channel zone policy can be based on addresses (e.g., the WWNs) of the FCoE network devices. Alternatively, if the WWNs (or any other type of addresses used in the Fibre Channel zone policy) for the FCoE network devices 300 and 306 are included in the data packet, the network switch 302 can enforce the Fibre Channel zone policy (e.g., using FIP-snooping filters) using those WWNs (or any other type of addresses), without resorting to the device database to determine the WWNs (or any other type of addresses) of the source and destination devices for the data packet.

If it is determined that the FCoE network device 306 is an approved device to communicate with the FCoE network device 300, the network switch 302 can be configured to send the data packet to the network switch 304, which can then forward the data packet to the FCoE network device 306, shown as the signal 380 in FIG. 3. Otherwise, if it is determined that the FCoE network device 306 is not an approved device to communicate with the FCoE network device 300, the network switch 302 can refrain from sending the data packet to the network switch 304, and optionally drop the data packet. In some embodiments, although not shown in FIG. 3, the network switch 304 can also be configured to enforce the Fibre Channel zone policy on the received data packet prior to forwarding the data packet to the FCoE network device 306 (e.g., using FIP-snooping filters). In some embodiments, as described herein, a switching module (e.g., the switching module 280 in FIG. 2) of the network switch 302 or 304 can be configured to route the data packet to an appropriate port of the network switch 302 or 304, which is coupled to an appropriate next-hop device.

Although shown in FIG. 3 and described herein as only two FCoE network devices coupled to a FCoE network establishing a connection via their ingress switches, in some other embodiments, a FCoE network device can operate an initialization and login process, and/or establish a connection with multiple other FCoE network devices in a similar way. In some embodiments, each FCoE network device coupled to the FCoE network can operate such an initialization and login process in a similar way. Furthermore, each FCoE network device coupled to the FCoE network can establish a connection and transmit Fibre Channel data with each of its approved devices (according to a Fibre Channel zone policy) in a similar way.

Figure 4:
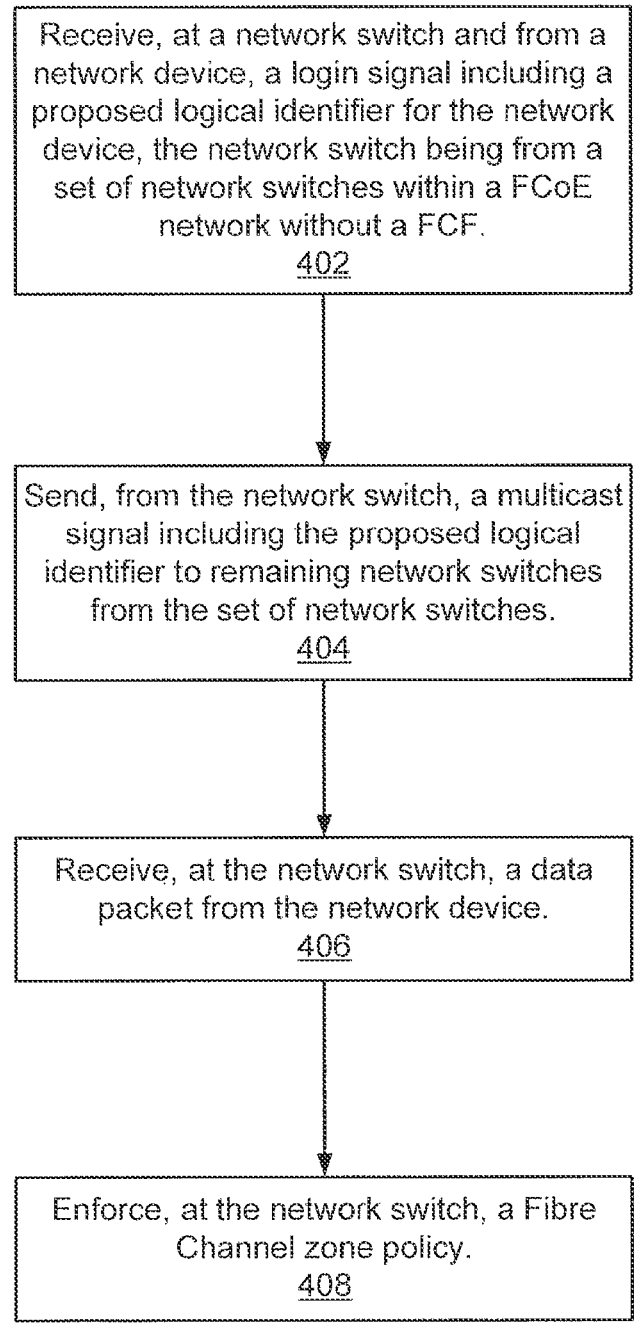
FIG. 4 is a flow chart illustrating a method of forwarding login signals, data packets, and enforcing a Fibre Channel zone policy at a network switch, according to an embodiment.

FIG. 4 is a flow chart illustrating a method of forwarding login signals, data packets, and enforcing a Fibre Channel zone policy at a network switch (e.g., using FIP-snooping filters), according to an embodiment. At 402, a login signal can be received from a network device at a network switch, where the logical signal can include a proposed logical identifier for the network device, and the network switch can be from a set of network switches within a FCoE network without a FCF. The network device can be, for example, a FCoE network device similar to the FCoE network devices 110-140 described with respect to FIG. 1 and the FCoE network devices 300, 306 described with respect to FIG. 3. In some embodiments, the network device can be a VN2VN FCoE network device. The FCoE network can be similar to the FCoE network 170 described with respect to FIG. 1, which does not include any central-controlling device such as a FCF. The network switch can be structurally and functionally similar to the network switches 200, 302 and 304 described with respect to FIGS. 2-3. In some embodiments, the network switch can be the ingress switch for the network device with respect to the FCoE network. In such embodiments, the network switch can be similar to the ingress switches 112-142 with respect to FIG. 1.

Specifically, after the network device is connected to the network switch and activated, the network device can be configured to select a logical identifier. The network device can then be configured to send a login signal including the selected logical identifier, as a proposed logical identifier for the network device, to the network switch. In some embodiments, the network device can be configured to select the logical identifier using, for example, a pseudo-random number generator. In some embodiments, the logical identifier can be selected based on an address of the network device, such as the WWN for the network device.

In the example of FIG. 1, after the FCoE network device 120 is connected to the ingress switch 122 within the FCoE network 170 and activated, the FCoE network device 120 can be configured to select a logical identifier. The FCoE network device 120 can then be configured to send a login signal including the selected logical identifier, as a proposed logical identifier for the FCoE network device 120, to the ingress switch 122. In some embodiments, the FCoE network device 120 can be configured to select the logical identifier using, for example, a pseudo-random number generator. In some embodiments, the FCoE network device 120 can be configured to select the logical identifier based on, for example, the WWN of the FCoE network device 120. Additionally, the FCoE network 170 does not include any central-controlling device such as a FCF and/or the like.

At 404, a multicast signal including the proposed logical identifier can be sent from the network switch to remaining network switches from the set of network switches. In some embodiments, prior to sending the multicast signal, the network switch can be configured to check for conflict between the proposed logical identifier and the existing logical identifier(s) stored within the network switch. Specifically, the network switch can be configured to compare the proposed logical identifier with each existing logical identifier stored in the network switch. Each existing logic identifier can represent one of the other network devices currently coupled to the FCoE network. The existing logical identifier(s) can be stored in, for example, a device database within the network switch.

If a conflict between the logical identifiers is detected, the network switch can be configured to send a conflict response signal to the network device. As a result, the network device can be configured to select another logical identifier and repeat from the step 402. Otherwise, if no conflict between the logical identifiers is detected, the network switch can be configured to send a multicast signal to remaining network switches within the FCoE network. The multicast signal can include the proposed logical identifier for the network device, and/or other related information (e.g., the WWN) of the network device.

In the example of FIG. 1, in response to receiving the proposed logical identifier from the FCoE network device 120, the ingress switch 122 can be configured to check conflict between logical identifiers by comparing the proposed logical identifier for FCoE network device 120 with the logical identifiers stored within the ingress switch 122. If a conflict between the logical identifiers is detected, the ingress switch 122 can be configured to send a conflict response signal to the FCoE network device 120, indicating the conflict. Otherwise, if no conflict between the logical identifiers is detected, the ingress switch 122 can be configured to send a multicast signal to the ingress switches 112, 132 and 142. The multicast signal can include the proposed logical identifier, and/or other related information (e.g., the WWN), of the FCoE network device 120.

At 406, a data packet can be received from the network device at the network switch. The data packet can include an address of a destination network device to which the data packet is addressed. Specifically, after the network device completes the initialization and login process, the network device can be configured to send a data packet addressed to the destination network device to the network switch. In some embodiments, the data packet can include addresses of both the network device and the destination network device. In some embodiments, the addresses included in the data packet can be the WWNs for the network device and the destination network device.

In the example of FIG. 1, after the FCoE network device 120 completes the initialization and login process, the FCoE network device 120 can be configured to send a data packet addressed to the FCoE network device 130 to the ingress switch 122. The data packet can include the WWN for the FCoE network device 120 as a source address, and the WWN for the FCoE network device 130 as a destination address.

At 408, a Fibre Channel zone policy can be enforced at the network switch (e.g., using FIP-snooping filters). In response to receiving the data packet from the network device, the network switch can be configured to enforce the Fibre Channel zone policy stored within the network switch to determine whether the network switch is authorized to forward the data packet to the destination network device or not. Specifically, if it is determined, based on the Fibre Channel zone policy, that the destination network device is an approved device for the network device (i.e., the destination network device is included in the same zone as the network device), then the network switch is authorized to forward the data packet to the destination network device. As a result, the network switch can be configured to forward the data packet to the destination network device accordingly. Otherwise, if it is determined, based on the Fibre Channel zone policy, that the destination network device is not an approved device for the network device (i.e., the destination network device is not included in the same zone as the network device), then the network switch is not authorized to forward the data packet to the destination network device. As a result, the network switch can be configured to drop the data packet accordingly.

In some embodiments, the Fibre Channel zone policy enforced at the network switch can be based on an address (e.g., the WWN) associated with the network device and an address associated with the destination network device. In such embodiments, the enforcing includes enforcing the Fibre Channel zone policy based on the address of the network device and the address of the destination network device.

In the example of FIG. 1, in response to receiving the data packet from the FCoE network device 120, the ingress switch 122 can be configured to enforce a Fibre Channel zone policy stored within the ingress switch 122 to determine whether the ingress switch 122 is authorized to forward the data packet to the FCoE network device 130 or not. Specifically, if it is determined, based on the Fibre Channel zone policy, that the FCoE network device 130 is an approved device for the FCoE network device 120 (i.e., the FCoE network device 130 is included in the same zone as the FCoE network device 120), then the ingress switch 122 is authorized to forward the data packet to the FCoE network device 130. As a result, the ingress switch 122 can be configured to forward the data packet to the ingress switch 132 accordingly, which can then send the data packet to the FCoE network device 130. Otherwise, if it is determined, based on the Fibre Channel zone policy, that the FCoE network device 130 is not an approved device for the FCoE network device 120 (i.e., the FCoE network device 130 is not included in the same zone as the FCoE network device 120), then the ingress switch 122 is not authorized to forward the data packet to the FCoE network device 130. As a result, the ingress switch 122 can be configured to drop the data packet accordingly. Additionally, in some embodiments, the Fibre Channel zone policy enforced at the ingress switch 122 can be based on the WWNs of the FCoE network device 120 and 130, and the Fibre Channel zone policy can be enforced at the ingress switch 122 based on the WWNs of the FCoE network device 120 and 130.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system, comprising:
 a first network switch configured to be within a Fibre Channel over Ethernet (FCoE) network having a plurality of network switches including the first network switch,
 the first network switch configured to receive, from a first network device, a login signal including a proposed logical identifier for the first network device,
 the first network switch configured to determine whether a conflict exists between the proposed logical identifier and remaining logical identifiers stored at the first network switch,
 the first network switch configured to send, in response to the login signal, a multicast signal including the proposed logical identifier to remaining network switches from the plurality of network switches in response to the proposed logical identifier being not in conflict with the remaining logical identifiers stored at the first network switch; and
 a second network switch from the plurality of network switches, the second network switch configured to receive the multicast signal from the first network switch, the second network switch configured to initiate enforcement of a zone policy in response to receiving the multicast signal and prior to sending the proposed logical identifier to a second network device,
 the second network switch configured to send a designated logical identifier of the first network device to the second network device based on the zone policy, the designated logical identifier of the first network device being not in conflict with remaining logical identifiers in the FCoE network and being different from the proposed logical identifier when the proposed logical identifier is in conflict with a logical identifier of the remaining logical identifiers in the FCoE network,
 the first network switch configured to send a data packet to the second network device when the second network device is an approved device based on the zone policy and in response to an acknowledgement signal received at the first network device from the second network device, the acknowledgement signal associated with the designated logical identifier,
 the second network switch configured to remove the designated logical identifier when the second network device is not an approved device based on the zone policy.

2. The system of claim 1, wherein the data packet is a first data packet, the first network switch is configured to receive, from the first network device, a second data packet to be sent to a third network device, the first network switch configured to enforce the zone policy to determine whether the first network device is authorized to send the second data packet to the third network device.

3. The system of claim 1, wherein the proposed logical identifier for the first network device is selected by the first network device using a pseudo-random number generator.

4. The system of claim 1, wherein the first network device and the second network device are Virtual Node (VN) Port to VN Port (VN2VN) FCoE network devices.

5. The system of claim 1, wherein the zone policy is based on a World Wide Name (WWN) associated with the first network device and a WWN associated with the second network device.

6. The system of claim 1, wherein the first network switch is configured to send the multicast signal including the proposed logical identifier to remaining network switches from the plurality of network switches such that a third network switch from the plurality of network switches refrains from sending the proposed logical identifier to a third network device based on the zone policy.

7. The system of claim 1, wherein the first network switch is configured to compare the proposed logical identifier with the remaining logical identifiers stored within a database at the first network switch to determine the conflict between the proposed logical identifier and a logical identifier from the remaining logical identifiers stored within the database at the first network switch and associated with a third network device.

8. The system of claim 1, wherein the proposed logical identifier is an identifier of a Virtual Fibre Channel N-Port of the first network device.

9. The system of claim 1, wherein the first network device is one of a storage device or a server.

10. A method, comprising:
 receiving, at a first network switch within a Fibre Channel over Ethernet (FCoE) network without a Fibre Channel Forwarder (FCF), a proposed logical identifier from a first network device, the FCoE network having a plurality of network switches including the first network switch and a second network switch;
 determining whether a conflict exists between the proposed logical identifier and remaining logical identifiers stored at the first network switch;
 sending, to the second network switch, a multicast signal including the proposed logical identifier causing the second network switch to enforce a Fibre Channel zone policy prior to sending the proposed logical identifier to a second network device in response to the proposed logical identifier being not in conflict with the remaining logical identifiers stored at the first network switch;
 sending, to the second network device, a designated logical identifier of the first network device based on the Fibre Channel zone policy, the designated logical identifier of the first network device being not in conflict with remaining logical identifiers in the FCoE network and being different from the proposed logical identifier when the proposed logical identifier is in conflict with a logical identifier of the remaining logical identifiers in the FCoE network;
 sending, to the second network device, a data packet when the second network device is an approved device based on the Fibre Channel zone policy and in response to an acknowledgement signal received at the first network device from the second network device, the acknowledgement signal associated with the designated logical identifier; and removing the designated logical identifier when the second network device is not an approved device based on the Fibre Channel zone policy.

11. The method of claim 10, further comprising:
sending, from the first network switch, the multicast signal including the proposed logical identifier to remaining network switches from the plurality of network switches.

12. The method of claim 10, wherein the Fibre Channel zone policy is based on a World Wide Name (WWN) associated with the first network device and a WWN associated with the second network device to which the data packet is addressed.

13. The method of claim 10, wherein the first network device is a Virtual Node (VN) Port to VN Port (VN2VN) FCoE network device.

14. The method of claim 10, wherein the Fibre Channel zone policy is enforced based on an address of the second network device and an address of the first network device.

15. An apparatus, comprising:
a first port at a first network switch configured to be within a Fibre Channel over Ethernet (FCoE) network having a plurality of network switches including the first network switch, the first port configured to be operatively coupled to a first network device, the first network switch configured to receive, via the first port and from the first network device, a FCoE login signal including a proposed logical identifier selected by the first network device, the first port configured to receive a FCoE data packet from the first network device after receiving the FCoE login signal;

an address resolution module executed by a processor and operatively coupled to the first port and at the first network switch, the address resolution module configured to, via the processor, determine whether a conflict exists between the proposed logical identifier and remaining logical identifiers stored at the first network switch, the address resolution module configured to, via the processor, send a multicast signal including the proposed logical identifier to remaining network switches including a second network switch from the plurality of network switches causing the second network switch to enforce a Fibre Channel zone policy in response to the proposed logical identifier being not in conflict with the remaining logical identifiers stored at the first network switch;

a zone enforcement module executed by the processor and operatively coupled to the first port and at the first network switch, the zone enforcement module configured to, via the processor, enforce the Fibre Channel zone policy on the FCoE data packet; and a second port at the first network switch, the second port configured to be operatively coupled to a second network device, the first network switch configured to send, via the second port and to the second network device, a designated logical identifier of the first network device based on the Fibre Channel zone policy, the designated logical identifier of the first network device being not in conflict with remaining logical identifiers in the FCoE network and being different from the proposed logical identifier when the proposed logical identifier is in conflict with a logical identifier of the remaining logical identifiers in the FCoE network, the first network switch configured to send, via the second port and to the second network device, the FCoE data packet when the second network device is an approved device based on the Fibre Channel zone policy and in response to an acknowledgement signal received at the first network device from the second network device, the acknowledgement signal associated with the designated logical identifier, the first network switch configured to remove the designated logical identifier when the second network device is not an approved device based on the Fibre Channel zone policy.

16. The apparatus of claim 15, wherein the proposed logical identifier is selected by the first network device using a pseudo-random number generator.

17. The apparatus of claim 15, wherein the first network device is a Virtual Node (VN) Port to VN Port (VN2VN) FCoE network device.

18. The apparatus of claim 15, wherein the Fibre Channel zone policy is based at least in part on a World Wide Name (WWN) associated with the first network device.

19. The apparatus of claim 15, wherein the proposed logical identifier is a proposed identifier of a Virtual Fibre Channel N-Port on the first network device.

20. The apparatus of claim 15, wherein the address resolution module is configured to compare the proposed logical identifier with the remaining logical identifiers stored within a database at the first network switch to determine the conflict between the proposed logical identifier and a logical identifier from the remaining logical identifiers of a third network device and stored within the database at the first network switch.

* * * * *